Dec. 17, 1929.  W. G. WEHR  1,740,053
WELDED JOINT
Filed March 10, 1927
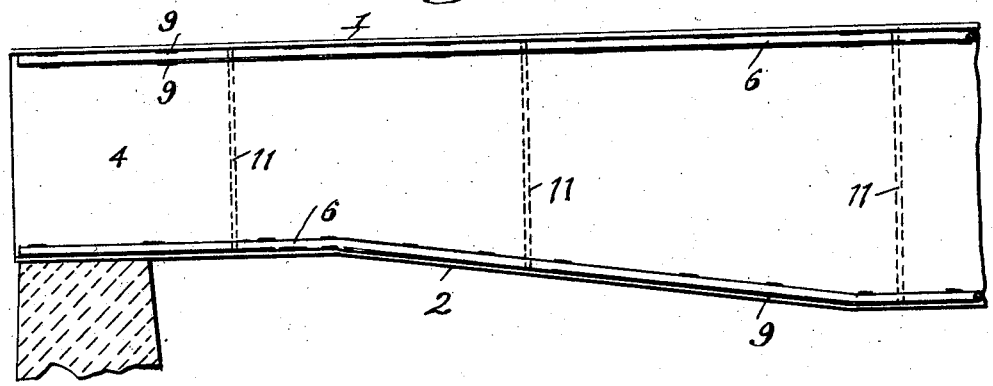
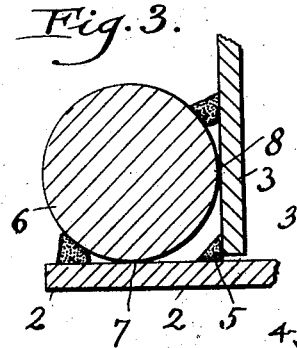
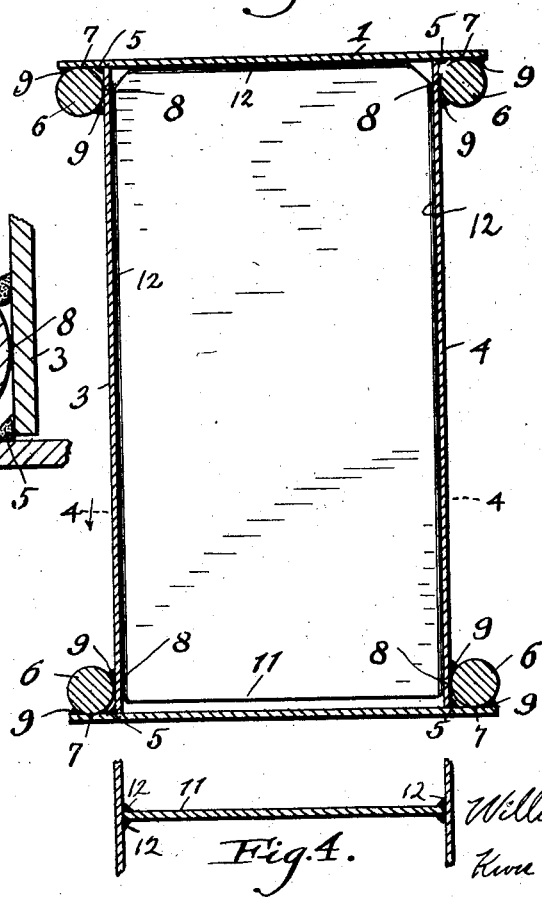
Inventor
William G. Wehr.

Patented Dec. 17, 1929

1,740,053

UNITED STATES PATENT OFFICE

WILLIAM G. WEHR, OF EAST CLEVELAND, OHIO, ASSIGNOR TO THE CLEVELAND CRANE & ENGINEERING COMPANY, OF WICKLIFFE, OHIO, A CORPORATION OF OHIO

WELDED JOINT

Application filed March 10, 1927. Serial No. 174,289.

This invention relates to structural elements such as hollow girders, beams, columns or the like, and has among its objects to increase the strength of such structural elements and economize metal in the construction thereof, and to simplify and cheapen their manufacture.

Other objects are to provide a hollow girder, beam, column or the like in which the parts are united solely by welding and to provide a structure in which the parts may be united by metallic arc welding.

A further object is to provide a hollow girder, beam, or the like with an internal reenforcement which is highly effective in resisting torsional stresses.

A further object is to provide a rigid, reenforced corner joint in which the plates and the reenforcing members are joined by welding.

The following description and the accompanying drawings set forth in detail certain means embodying the invention, the disclosed means, however, constituting but one of the various mechanical forms in which the principle of the invention may be employed.

Reference should be had to the accompanying drawings forming a part of this specification, in which:

Fig. 1 is a fragmentary side elevation of a box girder embodying my invention.

Fig. 2 is a vertical cross-section through the girder.

Fig. 3 is a cross-section through the corner joint showing the same on an enlarged scale.

Fig. 4 is a fragmentary transverse section through one of the diaphragm plates, the section being taken on the line indicated at 4—4 in Fig. 2.

While the invention is illustrated herein as applied to a box girder, it will be apparent that it is also applicable to other similar structural elements, such as beams, columns and the like.

In the accompanying drawings, the opposite face plates forming the top and bottom of the girder are indicated by the numerals 1 and 2, and the vertical web plates interposed between the top and bottom plates are indicated by the numerals 3 and 4. The web plates 3 and 4 are flat plates which are disposed between the top and bottom plates with their edges abutting the inner faces of said plates, the web plates 3 and 4 being spaced a short distance inwardly from the opposite side edges of the plates 1 and 2. In the manufacture of the girder, the web plates 3 and 4 are joined to the top and bottom plates by an electrical or other method of welding, in which weld metal 5 is deposited in the external angles between the web and face plates.

In order to reenforce the corners of the girders, reenforcing bars 6 which preferably extend the full length of the girder are laid in the external angles over the welds 5. The bars 6 are of a size and shape such that they will lie in contact with the inner faces of the top and bottom plates and the outer faces of the web plates clear of the weld metal 5, the bars contacting with the faces of the plates along lines spaced outwardly from the corner welds 5. The reenforcing bars 6 are preferably round in cross-section and of a diameter such that ample clearance is provided between the bar and the weld 5. As shown in Figs. 2 and 3, the bars 6 contact with the top and bottom plates along lines indicated at 7 and with the web plates along a line indicated at 8, and by reason of the cross-sectional shape of the bars the portions thereof outside the lines 7 and 8 diverge from the adjacent plates so that tapering spaces are provided in which metal 9 may be deposited by metallic arc welding or other suitable welding process to integrally unite the bars to the plates at points spaced outwardly beyond their lines of contact with the plates. An exceedingly strong joint is thus provided at each of the four corners of the girder by means of the rigid bar being integrally united with the two plates at points spaced from the corner weld, the rigidity of the joint being increased by reason of the engagement of the bar with the faces of the plates between the welds joining the bar to the plates and the welds joining the plates together.

In order to strengthen the girder against torsional stresses, it is common practice to provide transverse internal diaphragms at intervals along the length of the girder. Such diaphragms are usually provided with flanges along the edges thereof which are riveted to the walls of the girder. In accordance with the present invention, flat diaphragm plates 11 are provided which are of a width to fit between the web plates 3 and 4, with their opposite side edges abutting against the inner faces of the plates and with their upper edges abutting against the under side of the top plate. As shown in Figs. 2 and 4, the diaphragm plates 11 are integrally united at their edges with the web plates and top plate by means of welds 12 in the angles between the diaphragm and girder plates. These welds may be made before the bottom plate has been attached to the web plates. When the girder is subjected to torsional stresses, portions of the joints connecting the edges of the diaphragm to the plates are subjected to compression and other portions are at the same time subjected to tension. By directly welding the abutting edge of the diaphragm to the girder plates, a joint is provided which is more effective under tension than where the joint is between flanges of the diaphragm and the plates since the pull is directly in the plane of the diaphragm and tends to bend the flange.

As shown in the drawings, the lower reenforcing bar is bent to conform to the bottom of the girder, and the reenforcing bars at both the top and the bottom of the girder are rigidly united throughout their length to the girder plates. The welds, however, may not be continuous throughout the length of the bars, but may be made at intervals, as indicated in Fig. 1.

Having thus described my invention, I claim:

1. A box girder or similar structural element having face plates and spaced web plates between said face plates and united along their edges to the inner sides of said face plates inwardly of the edges of the face plates by welding, and longitudinally extending reenforcing bars lying in the external angles between said plates and welded to the adjacent faces thereof.

2. A box girder or similar structural element having face plates and spaced web plates between said face plates and united along their edges to the inner sides of said face plates inwardly of the edges of the face plates by welding in the external angles between the plates, and longitudinally extending reenforcing bars lying in said angles and covering the welded joints between the plates, said bars contacting with the plates outwardly from said welded joints and welded to said plates.

3. A box girder or similar structural element having face plates and spaced web plates between said face plates and united along their edges to the inner sides of said face plates inwardly of the edges of the face plates by welding, and longitudinally extending reenforcing bars lying in the external angles between the plates and contacting with said plates only along lines parallel with the joints between the plates and spaced outwardly therefrom, said bars being welded to the plates outwardly of the lines of contact therewith.

4. A box girder or similar structural element having face plates and spaced web plates between said face plates and united along their edges to the inner sides of said face plates inwardly of the edges of the face plates by welding, and round reenforcing bars lying in the external angles between the plates and welded along the length thereof to the adjacent faces of the face and web plates.

5. A box girder or similar structural element having face plates and spaced web plates between said face plates and united along their edges to the inner sides of said face plates inwardly of the edges of the face plates by metal deposited by welding in the external angles between the plates, and round reenforcing bars lying in said angles and contacting with the adjacent faces of the plates along lines spaced outwardly from the welded joints, said bars being joined to said plates by metal deposited by welding between said bars and plates.

6. A box girder or similar structural element having face plates and web plates between the face plates inwardly of the side edges thereof and united along their edges to said face plates, and transverse diaphragm plates within the girder at intervals along the length thereof, said diaphragm plates having opposite edges abutting the inner faces of the web plates and welded thereto.

7. A box girder or similar structural element having face plates and web plates between the face plates inwardly of the side edges thereof and united along their edges to said face plates, and transverse diaphragm plates within the girder at intervals along the length thereof, said diaphragm plates having opposite edges abutting the inner faces of the web plates and united thereto by welding in the angles between said web plates and diaphragm plates.

8. In a structure of the character described, a pair of plates, one having an edge abutting the face of the other and joined thereto by metal deposited by welding in the angle between the plates, and a reenforcing bar lying in said angle covering the weld metal therein, said bar being welded to the faces of said plates.

9. In a structure of the character described, a pair of plates, one having an edge abutting the face of the other and joined thereto by metal deposited by welding in the angle between the plates, and a reenforcing bar lying in said angle covering the weld metal therein, said bar engaging said plates along lines spaced outwardly from the weld metal in the angle and having portions outside the lines of contact diverging from said plates, said bar being joined to said plates by metal deposited between the plates and direrging portions of the bar.

10. A box girder or similar structural element having a face plate and web plates abutting said face plates inwardly of the side edges thereof and united thereto along the respective edges of said web plate, and a transverse diaphragm plate between said web plates and having opposite edges abutting the inner faces of the web plates, and another edge abutting said face plate, said diaphragm plate being united with said face plate and web plates by welding.

11. A box girder or similar structural element having face plates and web plates between the face plates inwardly of the side edges thereof and united along their edges to said face plates, and a transverse diaphragm plate, said diaphragm plate having opposite edges abutting the inner faces of the web plates and welded thereto.

12. A box girder or similar structural element, having a face plate and spaced web plates abutting the face plate inwardly of the side edges thereof, the edges of the web plates which abut the face plates being united thereto, and transverse diaphragm plates within the girder at intervals along the length thereof, said diaphragm plates having opposite edges abutting the inner faces of the web plates and welded thereto.

In testimony whereof, I hereunto affix my signature.

WILLIAM G. WEHR.